United States Patent
Hayashi et al.

(10) Patent No.: US 6,608,426 B2
(45) Date of Patent: *Aug. 19, 2003

(54) DRIVING DEVICE OF A VIBRATION TYPE ACTUATOR

(75) Inventors: Tadashi Hayashi, Yokohama (JP); Akio Atsuta, Yokosuka (JP); Kenichi Kataoka, Yokohama (JP); Shinji Yamamoto, Yokohama (JP); Jun Ito, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,290

(22) Filed: Dec. 8, 1999

(65) Prior Publication Data

US 2002/0096970 A1 Jul. 25, 2002

(30) Foreign Application Priority Data

Dec. 10, 1998 (JP) ............................................. 10-368476

(51) Int. Cl.$^7$ ............................................. H01L 41/09
(52) U.S. Cl. .................................................... 310/317
(58) Field of Search ....................... 310/316.01, 316.02, 310/316.03, 317, 318

(56) References Cited

U.S. PATENT DOCUMENTS

| | | | |
|---|---|---|---|
| 4,639,735 A | * 1/1987 | Yamamoto et al. | 346/1.1 |
| 4,714,935 A | * 12/1987 | Yamamoto et al. | 346/140 R |
| 4,965,481 A | * 10/1990 | Kashiyama | 310/316.01 |
| 5,001,404 A | 3/1991 | Kataoka | 318/116 |
| 5,004,964 A | 4/1991 | Kataoka et al. | 318/128 |
| 5,134,333 A | 7/1992 | Atsuta | 310/323 |
| 5,140,231 A | * 8/1992 | Kashiyama | 318/116 |
| 5,157,300 A | 10/1992 | Kataoka et al. | 310/323 |
| 5,231,325 A | 7/1993 | Tamai et al. | 310/323 |
| 5,247,221 A | 9/1993 | Atsuta | 310/323 |
| 5,285,134 A | 2/1994 | Kataoka | 318/116 |
| 5,298,829 A | 3/1994 | Tsukimoto et al. | 310/323 |
| 5,300,850 A | 4/1994 | Okumura et al. | 310/323 |
| 5,436,521 A | 7/1995 | Kataoka | 310/317 |
| 5,459,370 A | 10/1995 | Kataoka | 310/317 |
| 5,484,216 A | 1/1996 | Kimura et al. | 400/319 |
| 5,539,268 A | 7/1996 | Kataoka | 310/316 |
| 5,612,598 A | 3/1997 | Fukui et al. | 318/116 |
| 5,631,516 A | 5/1997 | Kataoka | 310/316 |
| 5,656,881 A | 8/1997 | Atsuta | 310/316 |
| 5,739,621 A | 4/1998 | Atsuta et al. | 310/316 |
| 5,889,350 A | 3/1999 | Yamamoto | 310/316 |
| 5,920,144 A | 7/1999 | Atsuta | 310/316 |
| 5,939,851 A | 8/1999 | Kataoka et al. | 318/611 |
| 5,986,385 A | 11/1999 | Atsuta | 310/323 |
| 6,031,316 A | 2/2000 | Kataoka | 310/316 |
| 6,037,701 A | 3/2000 | Atsuta et al. | 310/316.01 |
| 6,049,156 A | 4/2000 | Yamamoto et al. | 310/316.01 |
| 6,121,714 A | * 9/2000 | Atsuta | 310/316.01 |
| 6,147,433 A | * 11/2000 | Reineke et al. | 310/316.03 |

FOREIGN PATENT DOCUMENTS

| | | | | |
|---|---|---|---|---|
| JP | 63-1379 | 1/1988 | | H02N/2/00 |
| JP | 63-262070 | 10/1988 | | H02N/2/00 |
| JP | 4-140075 | 5/1992 | | H02N/2/00 |
| JP | 9-37572 | 2/1997 | | H02N/2/00 |

* cited by examiner

Primary Examiner—Thomas M. Dougherty
(74) Attorney, Agent, or Firm—Fitzpatrick, Cella, Harper & Scinto

(57) ABSTRACT

A vibration type activator having improved electro-mechanical energy conversion efficiency and reduced noise generation includes plural switching elements each of which is operated by a switching pulse signal generated by a drive control circuit of the motor. A drive control circuit selects a pulse width of the generated switching pulse signal such that the amplitude of a base wave frequency component ("base wave") among frequency components of a voltage applied to an inductance element may be larger than a total amplitude of higher harmonic wave frequency components ("whole higher harmonic wave").

19 Claims, 11 Drawing Sheets

DRIVING DEVICE OF A VIBRATION TYPE ACTUATOR

BACKGROUND OF THE INVENTION

1. Field of the Invention

The present invention relates to a driving device of a vibration type actuator, and more particularly, to a driving device of a vibration type actuator for exciting and vibrating an electro-mechanical energy conversion element by applying a periodic signal to the element and obtaining a driving force.

2. Related Background Art

There is a vibration type actuator constructed by plural piezoelectric elements having polarities inverted to each other and a vibration member adhered to these piezoelectric elements as one form of the vibration type actuator. Alternating signals of two phases having a phase difference of 90 degrees to each other are applied to each of the piezoelectric elements. Thus, a traveling wave is generated on the vibration member. When a moving member is brought into press contact with the vibration member, the moving member can obtain a driving force by a frictional force.

In comparison with an actuator using an electromagnetic force, the vibration type actuator has such a characteristic that driving torque at low speed is larger and responsiveness is better and it is sufficiently quiet for a user to be unaware of a driving sound since vibration in a frequency range equal to or greater than an audible range is utilized. Since the vibration type actuator has such features, the vibration type actuator may be used, e.g., in a driving section of an image printer.

The vibration type actuator generally requires a large alternating voltage. One method for obtaining the large alternating voltage is amplifying a driving signal using a linear amplifier; another method is raising a voltage using a transformer; yet another method is utilizing resonance with a capacity component of the vibration type actuator by combining an inductance element and a switching element with each other. The voltage may be raised using one of these methods, or by combining plural methods with each other.

The method of raising the voltage using a transformer and the method of switching and raising the voltage by combining an inductance element and a switching element with each other are preferably used among the above methods since these two methods are excellent in view of efficiency, cost, space, and the like.

However, higher harmonic waves of the driving signal are always included in a driving signal in which the voltage is raised using switching. These higher harmonic waves do not contribute to driving. Instead, it is feared that these higher harmonic waves become useless energy loss, cause heating of the actuator, cause undesirable vibration, and become a noise source. In the switching system, a waveform is generally smoothed by matching of the inductance element and the capacity component of the vibration type actuator, but a larger higher harmonic wave component causes useless heating of the inductance element.

A method for raising the voltage by generating a driving pulse signal based on a pulse signal having a frequency four times the driving frequency is shown in Japanese Patent Application Laid-Open Nos. 63-1379 and 63-262070. In this method, the duty of the pulse signal is limited to 25% or 50% and a driving operation having preferable energy conversion efficiency can not be performed, since there are many higher harmonic wave components.

A method for modulating a pulse width is shown in Japanese Patent Application Laid-Open No. 4-140075. In this method, efficiency is not necessarily good and a driving operation that reduces generation of noises can not necessarily be performed.

SUMMARY OF THE INVENTION

The present invention has been made in view of the foregoing problems, and therefore has an object thereof to provide a driving device having a vibration type actuator for improving electro-mechanical energy conversion efficiency and reducing generation of noise.

One aspect of the present invention resides in a driving device of a vibration type actuator for obtaining a driving force by exciting an electro-mechanical energy conversion element by applying a periodic signal to the electro-mechanical energy conversion element, comprising: a D.C. power source; plural switching elements connected to the D.C. power source; an inductance element connected to the plural switching elements for raising the voltage; and a drive control circuit for generating a switching pulse for operating the plural switching elements, wherein each of the plural switching elements is operated by the switching pulse generated by the drive control circuit, and the drive control circuit selects a width of the generated switching pulse so as to set the amplitude of a base wave frequency component among frequency components of a voltage applied to the inductance element to be larger than a total amplitude of higher harmonic wave frequency components.

Another aspect of the present invention also resides in a driving device of a vibration type actuator for obtaining a driving force by exciting an electro-mechanical energy conversion element by applying a periodic signal to the electro-mechanical energy conversion element, comprising: a D.C. power source; plural switching elements connected to the D.C. power source; an inductance element connected to the plural switching elements for raising the voltage; and a drive control circuit for generating a switching pulse for operating the plural switching elements, wherein each of the plural switching elements is operated by the switching pulse generated by the drive control circuit, and the drive control circuit selects a width of the generated switching pulse so as to set at approximately a maximum value an amplitude ratio of a base frequency component to a total amplitude of higher harmonic wave frequency components of a voltage applied to the inductance element.

Another aspect of the present invention also resides in a driving device of a vibration type actuator for obtaining a driving force by exciting an electro-mechanical energy conversion element by applying a periodic signal to the electro-mechanical energy conversion element, comprising: a D.C. power source; plural switching elements connected to the D.C. power source; an inductance element connected to the plural switching elements for raising the voltage; and a drive control circuit for generating a switching pulse for operating the plural switching elements, wherein the drive control circuit gradually increases a width of the generated switching pulse from zero at a rising time and operates the plural switching elements by the switching pulse so that the drive control circuit sweeps the pulse width until an amplitude ratio of a base wave frequency component to a total amplitude of higher harmonic wave frequency components of a voltage applied to the inductance element is approximately maximum, and the drive control circuit fixes the pulse width in this state.

Another aspect of the present invention resides in a driving device of a vibration type actuator for obtaining a driving force by exciting an electro-mechanical energy conversion element by applying a periodic signal to the electro-mechanical energy conversion element, comprising: a D.C. power source; plural switching elements connected to the D.C. power source; and a drive control circuit for generating a switching pulse for operating the plural switching elements, wherein each of the plural switching elements is operated by the switching pulse generated by the drive control circuit, and the drive control circuit selects a width of the generated switching pulse so as to set the amplitude of a base wave frequency component among frequency components of a voltage applied to the electro-mechanical energy conversion element to be larger than a total amplitude of higher harmonic wave frequency components.

Another aspect of the present invention resides in a driving device of a vibration type actuator for obtaining a driving force by exciting an electro-mechanical energy conversion element by applying a periodic signal to the electro-mechanical energy conversion element, comprising: a D.C. power source; plural switching elements connected to the D.C. power source; and a drive control circuit for generating a switching pulse for operating the plural switching elements, wherein each of the plural switching elements is operated by the switching pulse generated by the drive control circuit, and the drive control circuit selects a width of the generated switching pulse so as to set an amplitude ratio of a base frequency component to a total amplitude of higher harmonic wave frequency components of a voltage applied to the electro-mechanical energy conversion element to be approximately maximum.

Another aspect of the present invention resides in a driving device of a vibration type actuator for obtaining a driving force by exciting an electro-mechanical energy conversion element by applying a periodic signal to the electro-mechanical energy conversion element, comprising: a D.C. power source; plural switching elements connected to the D.C. power source; and a drive control circuit for generating a switching pulse for operating the plural switching elements, wherein the drive control circuit gradually increases a width of the generated switching pulse from zero at a rising time and operates the plural switching elements by the switching pulse so that the drive control circuit sweeps the pulse width until an amplitude ratio of a base wave frequency component to a total amplitude of higher harmonic wave frequency components of a voltage applied to the electro-mechanical energy conversion element is approximately maximum, and the drive control circuit fixes the pulse width in this state.

Another aspect of the present invention resides in a driving device of a vibration type actuator for obtaining a driving force by applying a periodic signal to an electro-mechanical energy conversion element portion arranged in a vibration member, comprising: a switching element switched in response to a pulse signal; an inductance element through which an electric current intermittently flows by switching the switching element; and setting means for applying a voltage generated by intermittently flowing the electric current through the inductance element to the electro-mechanical energy conversion element portion, and setting a duty of the pulse signal to a duty in which a base frequency component among frequency components of a voltage applied to the inductance element is larger than a higher harmonic wave component.

DESCRIPTION OF THE PREFERRED EMBODIMENTS

Preferred embodiments of the present invention will next be explained with reference to the drawings.

First Embodiment

Figure 1:
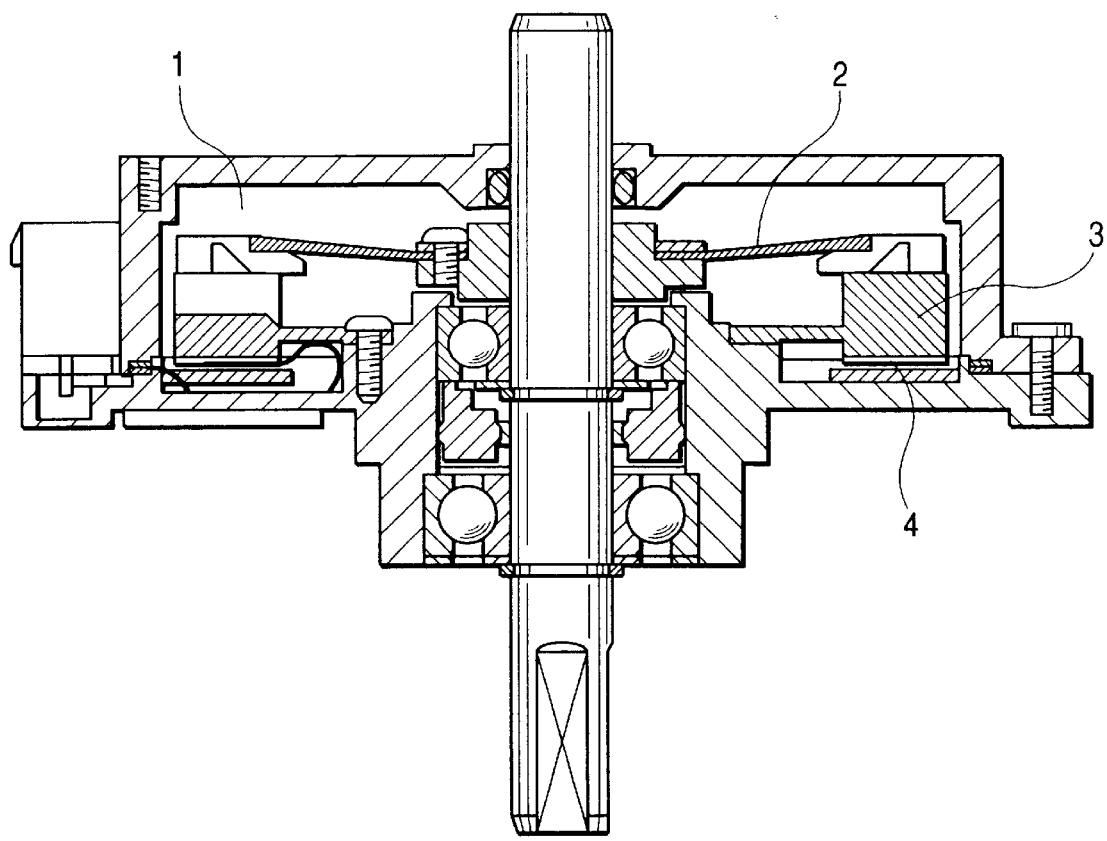
FIG. 1 is a cross-sectional view showing the construction of a vibration type actuator operated by a driving device in accordance with a first embodiment of the present invention.

FIG. 1 is a cross-sectional view showing the construction of a vibration type actuator operated by a driving device in accordance with a first embodiment of the present invention. Here, the vibration type actuator of an annulus ring shape is shown as one example.

In FIG. 1, reference numerals 1, 2, 3 and 4 respectively designate a rotor, a pressurizing spring, a stator (vibration member) and a piezoelectric element serving as an electro-mechanical energy conversion element. Plural piezoelectric elements 4 of different polarities are adhered to the stator (vibration member) 3 and alternating signals of two phases having a phase difference of 90 degrees relative to each other are applied to the piezoelectric elements 4. Thus, a traveling wave is generated on a surface of the stator (vibration member) 3 and the rotor 1 is brought into press contact with the stator (vibration member) 3 by the pressurizing spring 2 so that the rotor 1 obtains a driving force. A frictional member having a predetermined frictional coefficient different from that of a base material is arranged in respective contact portions of the stator (vibration member) 3 and the rotor 1.

Figure 2:
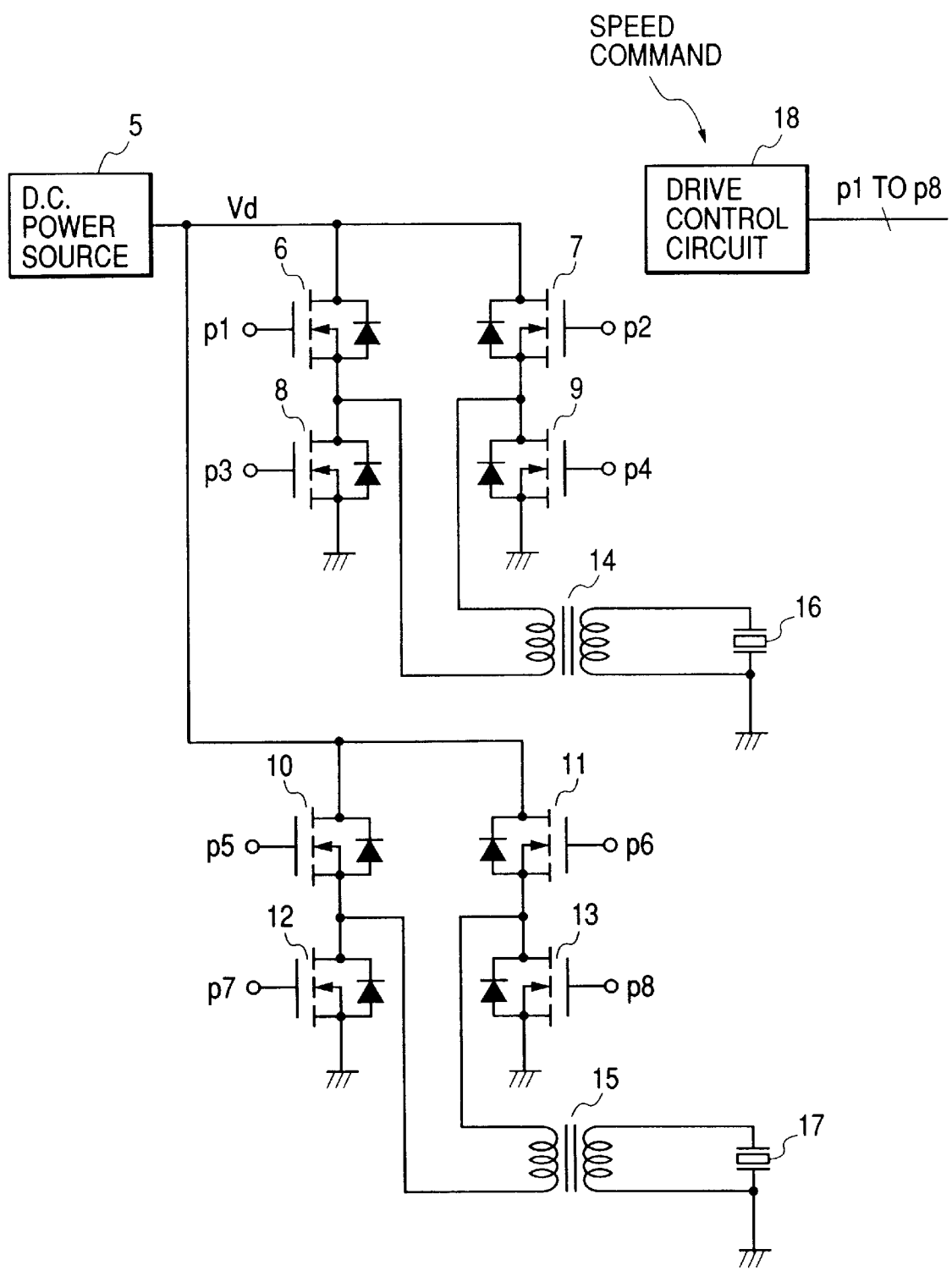
FIG. 2 is a circuit diagram showing the driving device in accordance with the first embodiment for making an alternating signal applied to a piezoelectric element.

FIG. 2 is a circuit diagram showing the driving device in accordance with the first embodiment for making the alternating signals applied to the piezoelectric elements 4.

A driving voltage of several hundred volts is required to operate the vibration type actuator shown in FIG. 1. Therefore, as shown in FIG. 2, a full bridge circuit is connected to each of the primary sides of transformers 14, 15. Namely, the full bridge circuit constructed by switching elements 6 to 9 is connected to the primary side of the transformer 14. Similarly, a full bridge circuit constructed by switching elements 10 to 13 is connected to the primary side of the transformer 15. Each of the switching elements 6 to 13 is constructed by a MOSFET. Piezoelectric elements 16, 17 are respectively connected to secondary sides of the transformers 14, 15. Each of the full bridge circuits switches a power voltage from a D.C. power source 5 and supplies a high voltage to both ends of each of the piezoelectric elements 16, 17 by raising the power voltage using the transformers 14, 15.

Each of driving pulses p1 to p8 is transmitted from a drive control circuit 18 to each of the gates of the switching elements 6 to 13 each constructed by a MOSFET.

Figure 3:
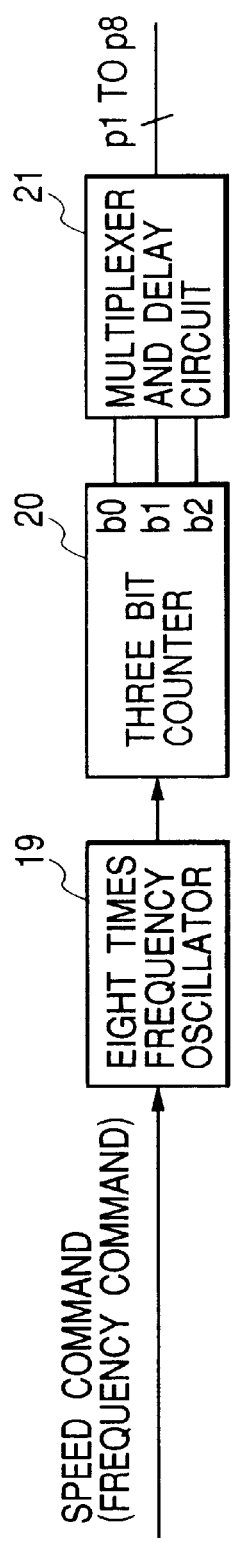
FIG. 3 is a block diagram showing the internal construction of a drive control circuit.

FIG. 3 is a block diagram showing an internal construction of the drive control circuit 18.

In FIG. 3, an eight times frequency oscillator 19 generates a periodic signal of a frequency eight times a driving frequency in accordance with a speed command (frequency command) sent from the exterior as a target rotational speed of the vibration type actuator. In the vibration type actuator, a relation shown in FIG. 4 exists between the rotational speed of the vibration z type actuator and the frequency of a driving alternating voltage sent to the vibration type actuator. Accordingly, the rotational speed of the vibration type actuator can be controlled by adjusting the frequency of the driving alternating voltage. Here, a frequency corresponding to such a target rotational speed is sent to the drive control circuit 18 and the eight times frequency oscillator 19 generates a pulse signal having a frequency eight times the sent frequency.

A three bit counter 20 and a multiplexer and delay circuit 21 generate driving pulses p1 to p8 based on an output pulse of the eight times frequency oscillator 19. Namely, the three bit counter 20 counts the number of input pulses and outputs three bit counting values b0 to b2. However, the three bit counter 20 is set to a cyclic counter. Accordingly, when a counting value reaches "111", the counting value is next returned to "000". The multiplexer and delay circuit 21 generates driving pulses p1 to p8 based on such output counting values b0 to b2 of the three bit counter 20.

Figure 5:
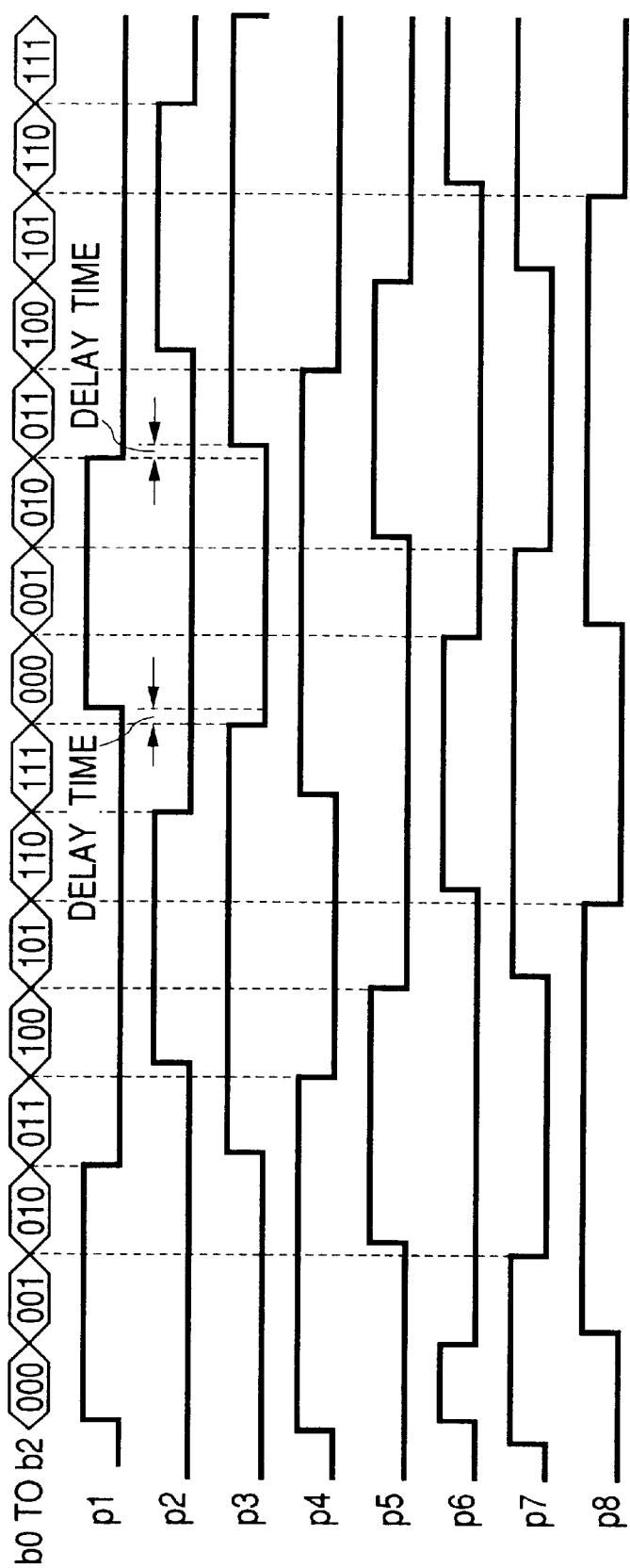
FIG. 5 is a timing chart showing a driving signal generated by a multiplexer and delay circuit.

FIG. 5 is a timing chart showing the driving pulses p1 to p8 generated by the multiplexer and delay circuit 21. Namely, a high voltage level of the driving pulse p1 is generated between counting values "000" and "010". A high voltage level of the driving pulse p2 is generated between counting values "100" and "110". A high voltage level of the driving pulse p3 is generated between counting values "011" and "111". A high voltage level of the driving pulse p4 is generated between counting values "000" and "011". A delay time is set to prevent an occurrence where switching elements (switching elements 6 and 8, or switching elements 7 and 9) in a series connection relation of the full bridge circuit are simultaneously turned on and a through electric current flows through these switching elements. The delay time is set during a rising operation of each driving signal such that, until a predetermined delay time has passed after turning-off of one switching element, the other switching element is not turned on.

Similarly, a high voltage level of the driving pulse p5 is generated between counting values "010" and "100". A high voltage level of the driving pulse p6 is generated between counting values "110" and "000". A high voltage level of the driving pulse p7 is generated between counting values "101" and "001". A high voltage level of the driving pulse p8 is generated between counting values "001" and "101". A delay time is similarly set during a rising operation of each of the driving pulses p5 to p8.

As can be seen from the above explanation, driving pulses p1, p2, p5 and p6 for respectively operating switching elements 6, 7, 10 and 11 on a high voltage side of the full bridge circuit are set such that a turning-on time (high voltage level time) of each of these driving pulses is equal to 3/8 times a driving period (here, the description is made by neglecting the delay time for convenience of the explanation). The reasons for this are explained as follows.

Figure 6:
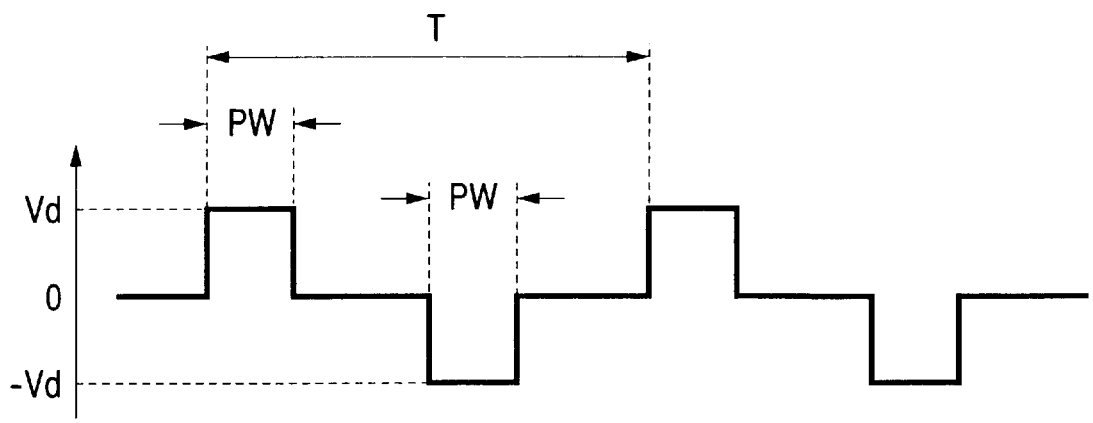
FIG. 6 is a view showing a time change of a voltage applied to both ends of the primary side of a transformer.

When a period is set to T and the turning-on time is set to PW in each of the driving pulses p1, p2 p5 and p6 a time change in voltage applied to both ends of the primary side of each of the transformers 14, 15 at an operating time is provided as shown in FIG. 6. Reference numeral Vd shows a voltage value of the D.C. power source 5.

Here, when a waveform of FIG. 6 is Fourier-expanded, the following formula (1) is obtained.

$$F(t) = \frac{4}{\pi} \cdot Vd \cdot \sum_{n=1}^{\infty} \frac{1}{n} \cdot \sin\frac{n\pi PW}{T} \cdot \sin\frac{n\pi}{2} \cdot \sin\frac{2n\pi}{T}t \quad (1)$$

Accordingly, coefficients at respective orders are expressed by the following formula (2).

$$\begin{cases} a_n \text{ (odd)} = \frac{4}{\pi} \cdot Vd \cdot \frac{1}{n} \cdot \sin\frac{n\pi PW}{T} & \text{(odd order)} \\ a_n \text{ (even)} = 0 & \text{(even order)} \end{cases} \quad (2)$$

Figure 7:
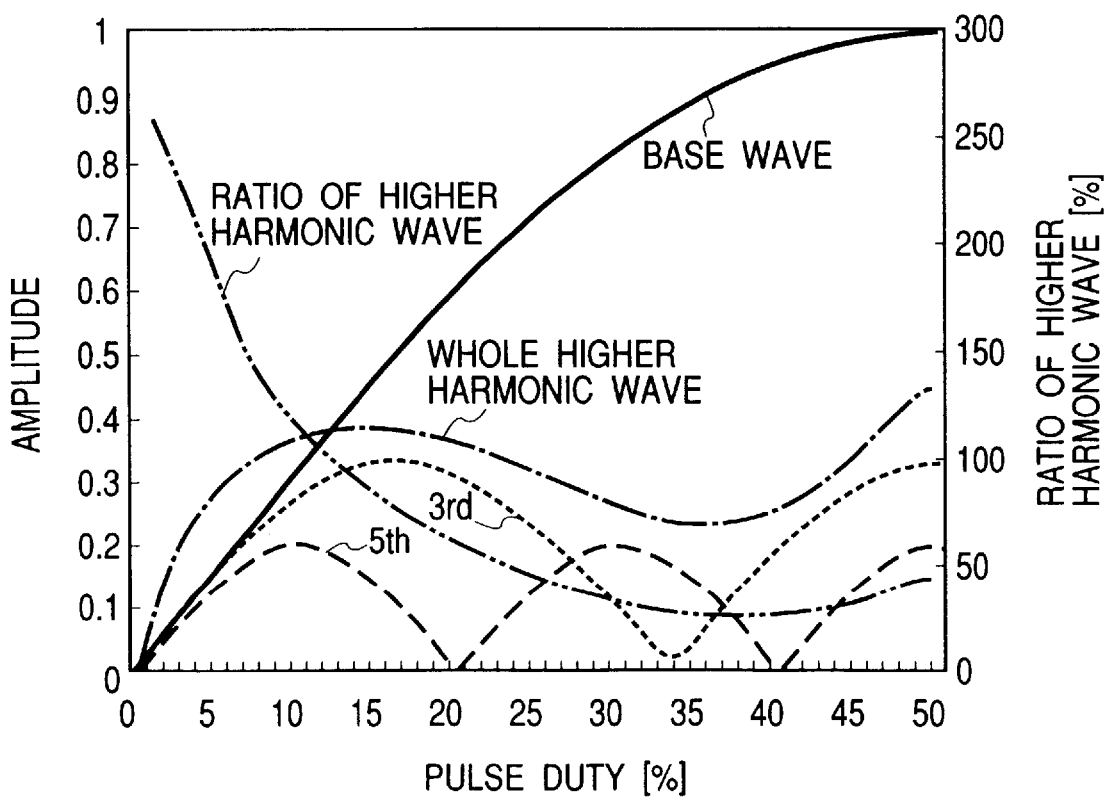
FIG. 7 illustrates the relation of magnitudes of a base wave and a higher harmonic wave with respect to the duty of the driving signal and a higher harmonic wave ratio.

Magnitudes of such coefficients at the respective orders are provided as shown in FIG. 7 when the duty of a driving signal, i.e., PW/T (%) is changed.

FIG. 7 illustrates the relation of magnitudes of a base wave and a higher harmonic wave with respect to duty of the driving signal and showing a higher harmonic wave ratio. In FIG. 7, "3rd" shows a third order higher harmonic wave and "5th" shows a fifth order higher harmonic wave. In FIG. 7, higher harmonic waves are normalized by coefficient $(4/\pi)$ Vd. The magnitude of a "whole higher harmonic wave" is obtained by calculating the square root of a square sum of all the normalized higher harmonic waves. The higher harmonic wave ratio is a ratio of the magnitude of the "whole higher harmonic wave" to the magnitude of the "base wave".

As can be seen from FIG. 7, a base wave component becomes maximum when the duty is 50%. However, when the duty is 50%, a higher harmonic wave component is also large and becomes thermal energy so that an efficient driving operation can not necessarily be performed. In contrast to this, when the duty is equal to or smaller than about 13%, the higher harmonic wave component is larger than the base wave so that efficiency is reduced.

A duty providing a larger base wave component and a smaller higher harmonic wave component is a duty having a smallest higher harmonic wave ratio. This duty approximately lies in a range of ±10% with about 37.5% as a center. The electro-mechanical energy conversion efficiency is best when the driving operation is performed in this duty.

In this embodiment, as described before, the piezoelectric elements are operated in a duty of 3/8=37.5% of a driving period at any time. Accordingly, a driving operation of more preferable energy conversion efficiency can be performed in comparison with a case in which the driving operation is performed in conventional duties of 25% and 50% or a case in which a pulse duty is changed. Further, since the higher harmonic wave component is small upon providing the same output, the generation of noise is small in comparison with a conventional example.

Figure 8:
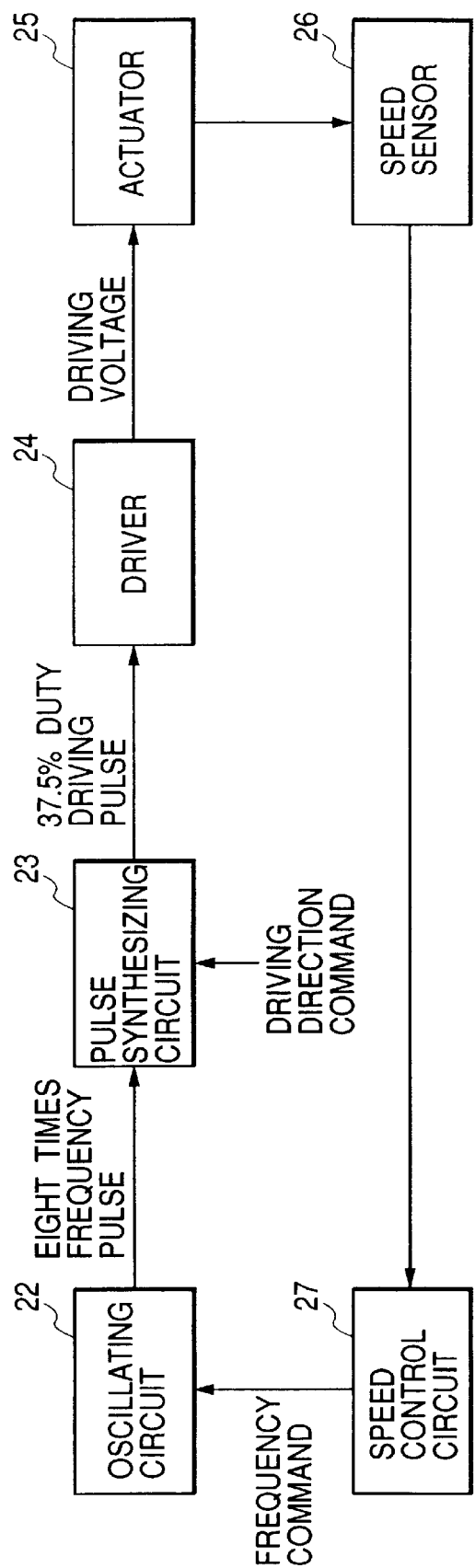
FIG. 8 is a block diagram showing a speed controller of the vibration type actuator.

FIG. 8 is a block diagram showing a speed controller of the vibration type actuator.

A speed sensor 26 such as a rotary encoder, etc. arranged in the actuator 25 detects a rotational speed of the actuator 25 and a speed detecting signal is sent to a speed control circuit 27. The speed control circuit 27 outputs as a command value to an oscillating circuit a frequency corresponding to a target rotational speed of the actuator 25 The oscillating circuit 22 receiving the command generates a pulse signal of one phase having a frequency eight times the frequency corresponding to the target rotational speed, and outputs the pulse signal to a pulse synthesizing circuit 23. The pulse synthesizing circuit 23 synthesizes an eight-phase pulse signal having a duty of 3/8=37.5% based on the eight times frequency pulse. A switching element of a driver 24 is turned on and off by the synthesized pulse signal and a voltage sufficient to operate the actuator 25 is output from the secondary side of a transformer.

Figure 4:
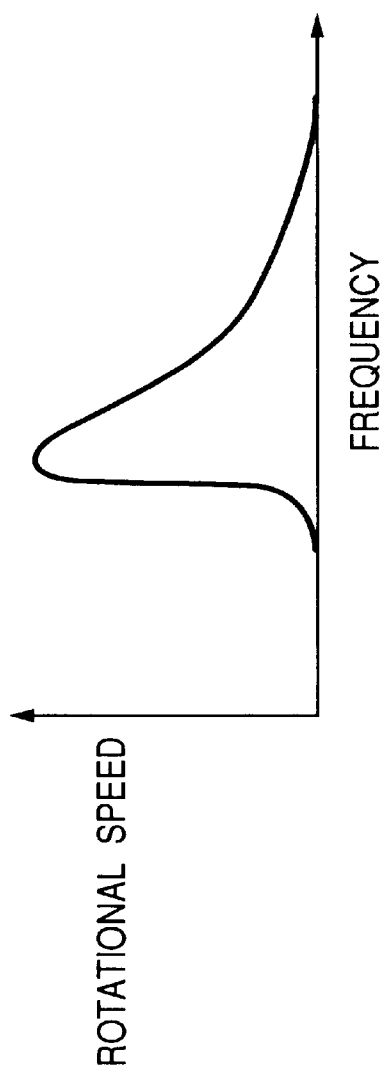
FIG. 4 is a graph showing driving frequency-rotational speed characteristics in the vibration type actuator.

The vibration type actuator has the relation as shown in FIG. 4 between a driving frequency and the rotational speed. Therefore, it is possible to perform speed control with high accuracy for converging the rotational speed to the target rotational speed by finely feedback-controlling the frequency.

A rotational direction of the vibration type actuator can be reversed by sending a driving direction command from the exterior to the pulse synthesizing circuit 23 and reversing the phase relation of driving pulses p1 to p4 and driving pulses p5 to p8 (changing the phase relation from delay to advance, or from advance to delay).

In the above first embodiment, the piezoelectric elements are operated in the duty of 3/8=37.5% of the driving period at any time. However, instead of this, the drive control circuit may select the pulse width of a generated switching pulse signal such that the amplitude of a base wave frequency component among frequency components of a voltage applied to the primary side of a transformer may be larger than a total amplitude of higher harmonic wave frequency components, although energy conversion efficiency is slightly reduced.

A driving circuit of two phases having a phase difference of 90 degrees is explained in FIGS. 2 and 5. However, a vibration type actuator of only one driving phase can be similarly operated by using driving pulses b1 to p4 or driving pulses p5 to p8

Figure 9:
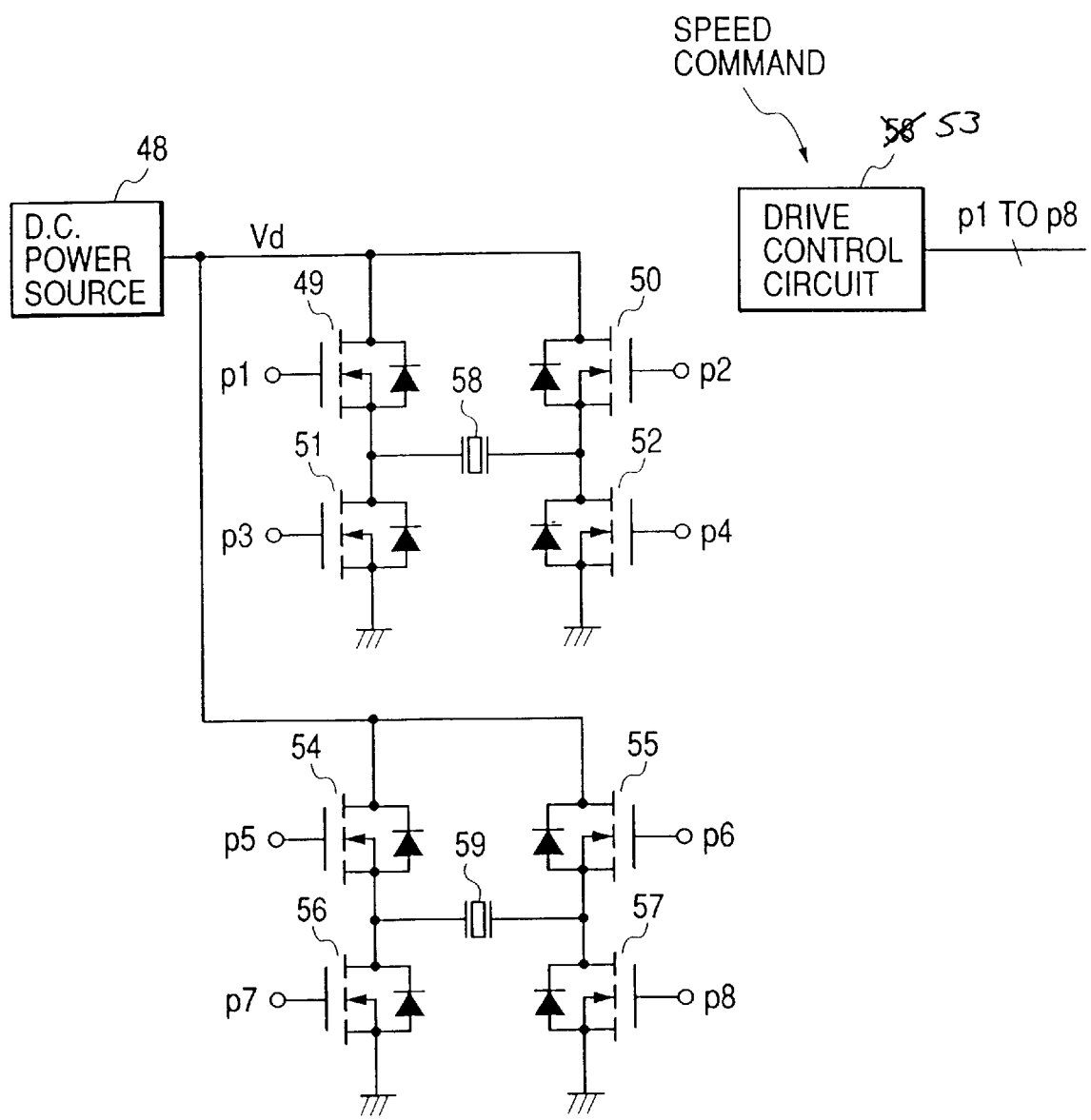
FIG. 9 illustrates a driving circuit constructed such that a transformer is omitted.

When the voltage of a D.C. power source is sufficiently high or the driving voltage of the vibration type actuator is low, similar effects also can be obtained even in a driving circuit shown in FIG. 9. FIG. 9 illustrates a driving circuit constructed such that the transformer is omitted. In FIG. 9, reference numerals 58, 59 designate piezoelectric elements and reference numerals 49 to 52 and 54 to 57 designate switching elements. Reference numerals 48 and 53 respectively designate a D.C. power source and a drive control circuit.

In contrast to the above first embodiment, the drive control circuit gradually increases the pulse width of a switching pulse signal from zero at a rising time. Each of the switching elements is operated by the switching pulse signal. As a result, the pulse width is swept until an amplitude ratio of a base wave frequency component to a total amplitude of higher harmonic wave frequency components of a voltage applied to a transformer becomes approximately maximum. A stationary switching operation also may be performed by the pulse signal by fixing the pulse width in this state.

Second Embodiment

Figure 10:
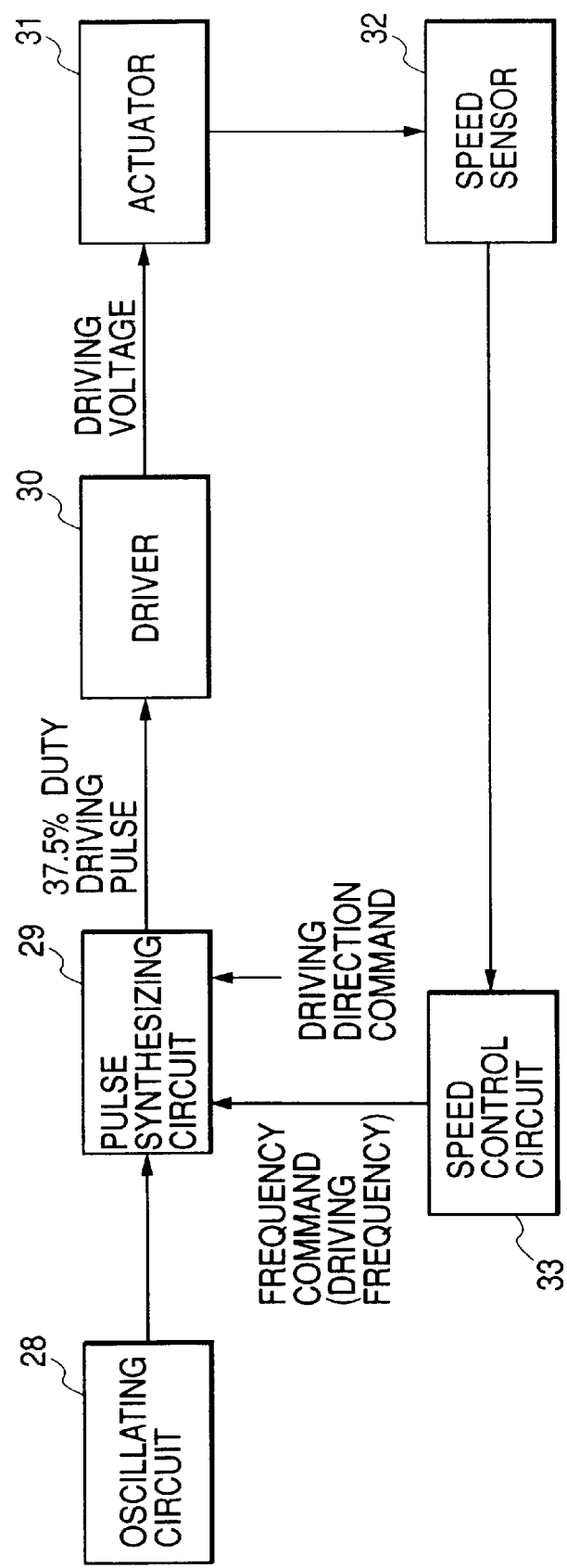
FIG. 10 is a block diagram showing a speed controller of a vibration type actuator in accordance with a second embodiment.

FIG. 10 is a block diagram showing a speed controller of a vibration type actuator in accordance with a second embodiment.

In the second embodiment, a speed sensor 32 such as a rotary encoder, etc. arranged in the actuator 31 detects a rotational speed of the actuator 31 and a speed detecting signal is sent to a speed control circuit 33. The speed control circuit 33 outputs a frequency signal corresponding to a target rotational speed of the actuator 31 to a pulse synthesizing circuit 29 as a command value. An oscillating circuit 28 is constructed by a crystal, etc. and outputs a pulse signal of a sufficiently high specific frequency about 1000 times a driving frequency of the actuator 31. The pulse synthesizing circuit 29 receives the command of the speed control circuit 33 and synthesizes a driving pulse signal having a duty of 37.5% by a required number of pulses on the basis of an output pulse of the oscillating circuit 28.

Figure 11:
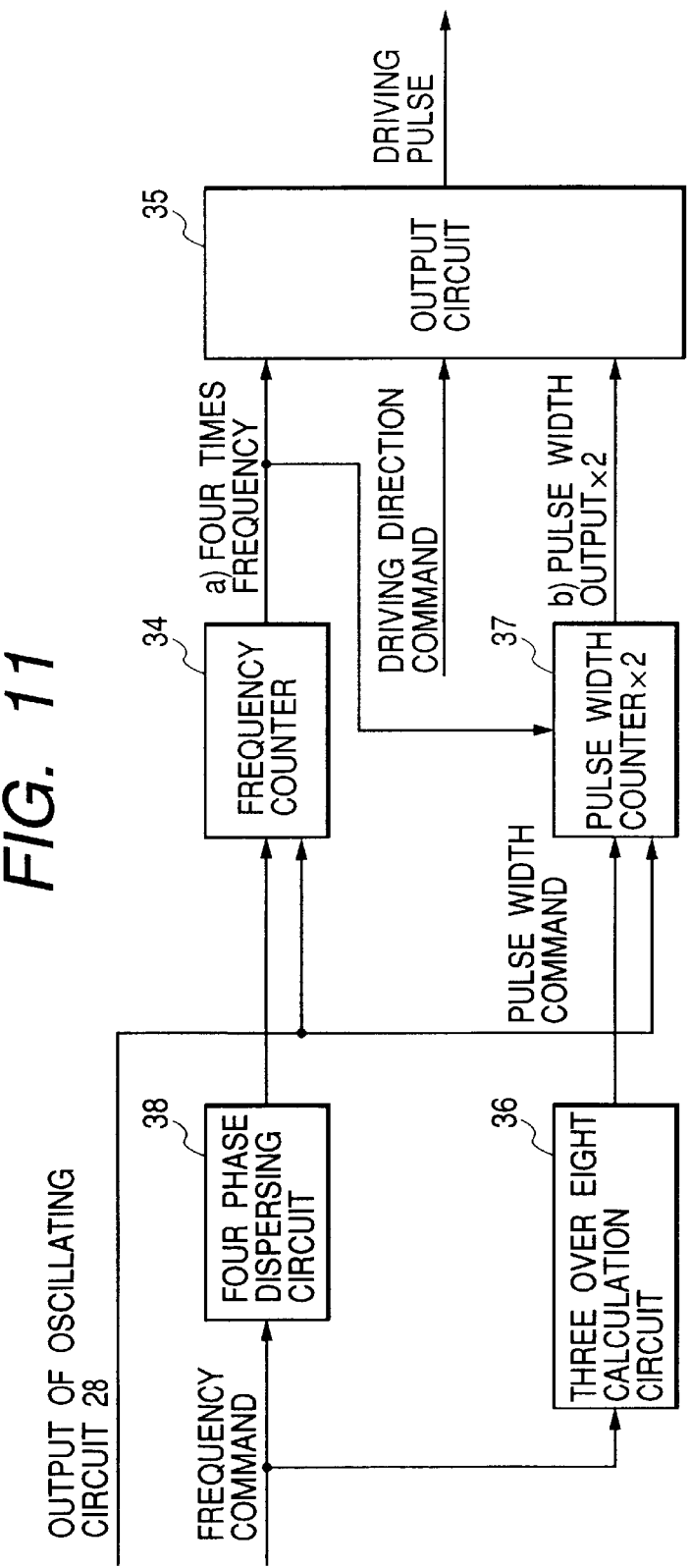
FIG. 11 is a block diagram showing the internal construction of a pulse synthesizing circuit.

FIG. 11 is a block diagram showing an internal construction of the pulse synthesizing circuit 29.

In FIG. 11, a frequency command sent from the speed control circuit 33 is input to a four phase dispersing circuit 38 and a three over eight calculation circuit 36. The four phase dispersing circuit 38 divides a period of the commanded frequency into four divisional periods and calculates the number of pulses of the oscillating circuit 28 to be generated within the obtained divisional periods and sends the pulse number to a frequency counter 34. The frequency counter 34 loads the sent pulse number and counts down by an output pulse from the oscillating circuit 28. Thus, the frequency counter 34 outputs a pulse (a) of one shot having a frequency about four times the command frequency to an output circuit 35.

Figure 12:
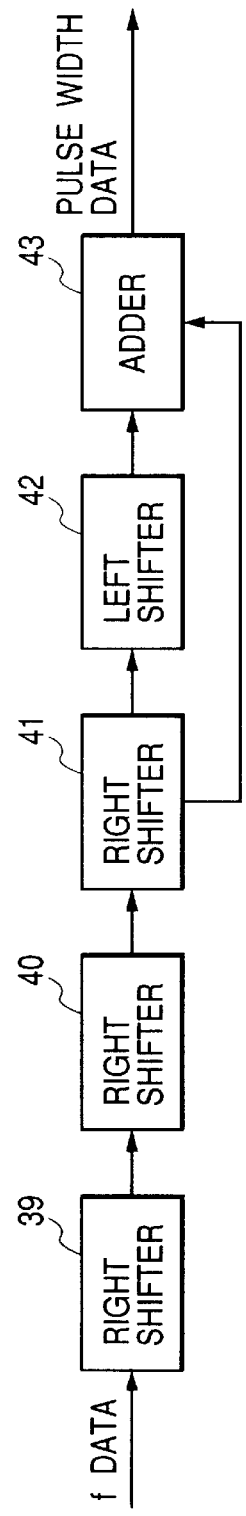
FIG. 12 is a block diagram showing the internal construction of a three over eight calculation circuit.

The three over eight calculation circuit 36 makes a pulse width command according to the frequency command and outputs the pulse width command to a pulse width counter 37. For example, when a command value of the frequency is given by binary digital data, the three over eight calculation circuit 36 is constructed by a digital circuit shown in FIG. 12. Namely, in the three over eight calculation circuit 36, right shifters 39 to 41 shift the frequency data rightwards by three bits. An adder 43 adds a value obtained by these shifters and a value obtained by shifting the obtained value leftwards by one bit by a left shifter 42. Thus, a frequency value 3/8 times the command frequency value is obtained. The frequency value is sent to the pulse width counter 37 as a pulse width command. "0" is set to a bit which becomes empty by the shifting operation. A bit overflown by the right shift is rounded down.

When the frequency counter 34 outputs a pulse of one shot, the pulse width command from the three over eight calculation circuit 36 is loaded to the pulse width counter 37. The pulse width counter 37 obtains a period from a frequency of the sent pulse width command, calculates the number of pulses of the oscillating circuit 28 to be generated within the period, loads the pulse number, and counts down by an output pulse from the oscillating circuit 28. Thus, a pulse (b) of one shot is output from the pulse width counter 37 at a timing corresponding to a pulse width of duty 37.5% (=3/8). When the duty is equal to or greater than 25t, turning-on periods of the pulse overlap each other in four phases. Therefore, two pulse width counters are used for the pulse width counter 37 and are alternately operated (are expressed by "×2" in FIG. 11).

Figure 13:
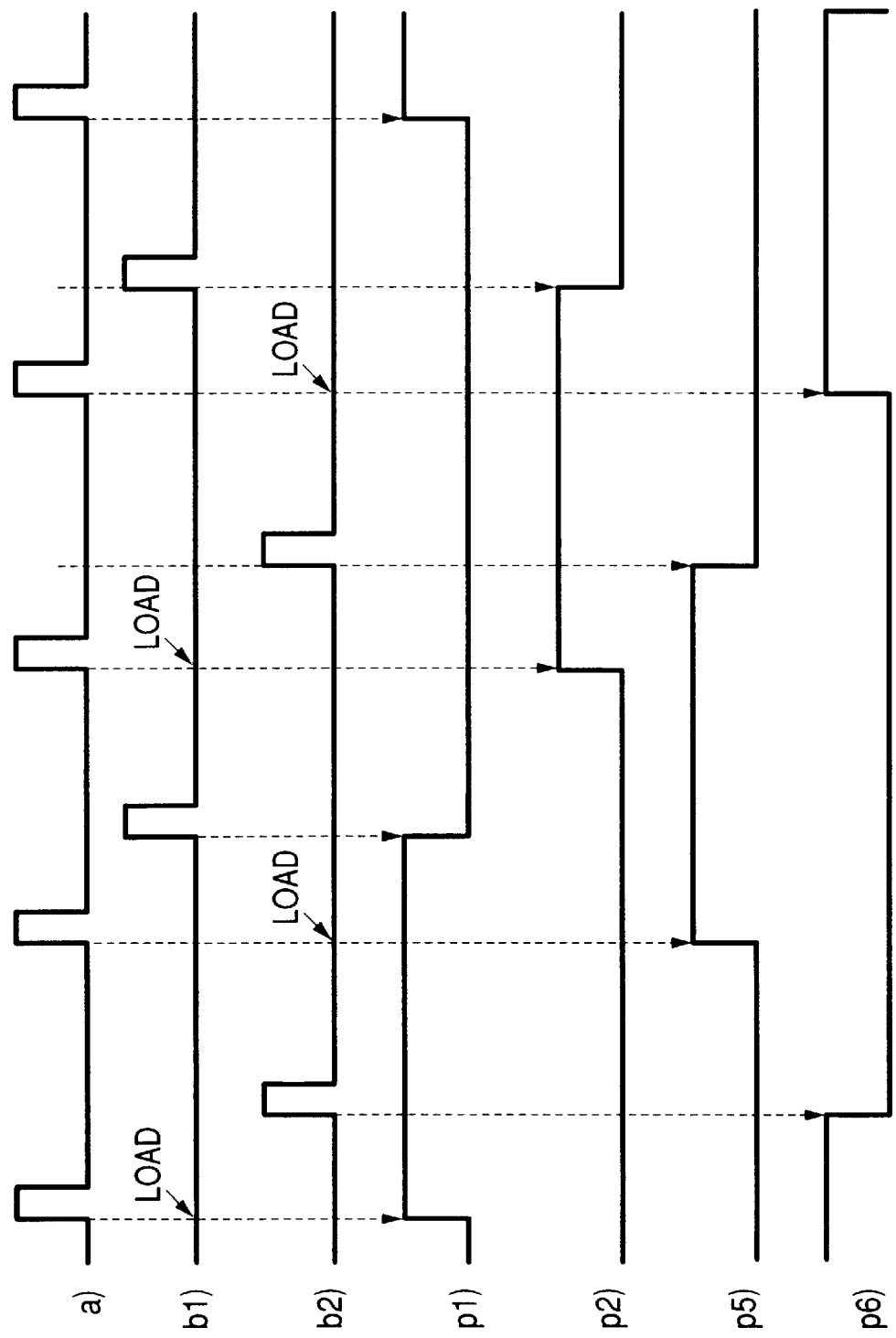
FIG. 13 is a timing chart showing input and output signals of an output circuit.

FIG. 13 is a timing chart showing input and output signals of the output circuit 35. In the second embodiment, driving pulses b1 to p8 the same as the driving pulses p1 to p8 in the first embodiment shown in FIG. 2 also are set to be used.

Driving pulses p1, p2 p5 and p6 rise at an edge of an output pulse (a) of the frequency counter 34 and fall at an edge of an output pulse (b1, b2) of the pulse width counter 37. Driving pulses p3, p4, p6 and p7 can be respectively synthesized by inverting the driving pulses p1, p2 p5 and p6 and arranging dead times before and after these driving pulses p1, p2 p5 and p6 although the construction is not shown. The dead times are set to prevent an occurrence where switching elements in a series connection relation of a full bridge circuit are simultaneously turned on and a through electric current flows through the switching elements. The dead times are set such that, a predetermined time passes after one switching element is turned off before the other switching element is turned on. The dead times may be set by a method shown in FIGS. 14 and 15, and may be also set by arranging a delay counter and measuring a suitable delay time by an output pulse of the oscillating circuit 28.

Figure 14:
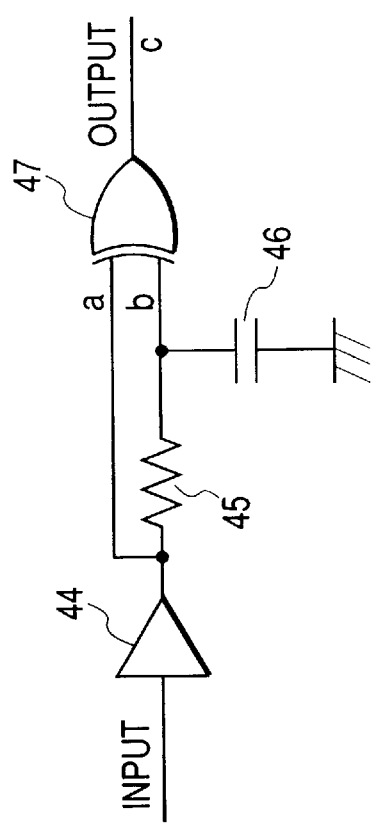
FIG. 14 is a block diagram showing the construction of a delay time generating circuit.
Figure 15:
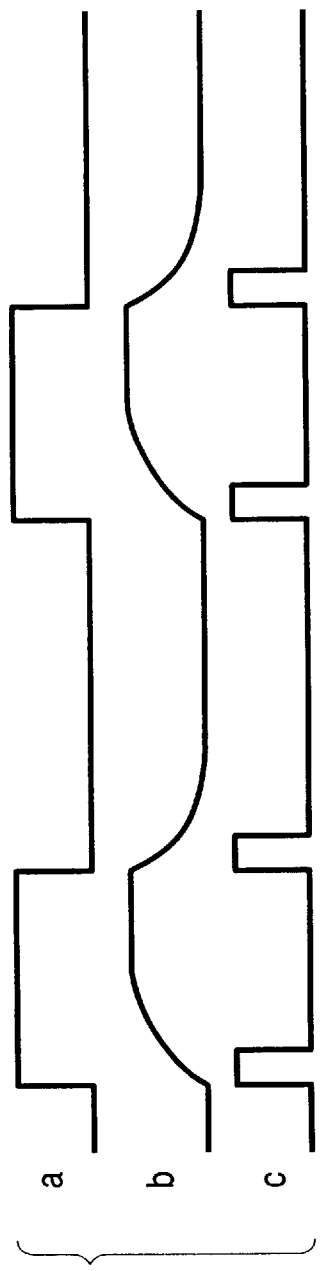
FIG. 15 is a timing chart showing a signal mode of each portion of the delay time generating circuit shown in FIG. 14.

FIG. 14 shows a delay time generating circuit in which reference numerals 44, 45, 46 and 47 respectively designate a buffer, a resistor, a capacitor and an exclusive OR circuit. FIG. 15 is a timing chart showing signal forms of respective portions of the delay time generating circuit shown in FIG. 14. A pulse (c) having a predetermined delay time determined in accordance with values of the resistor 45 and the capacitor 46 can be obtained as an output of the exclusive OR circuit 47.

In the above embodiment, a frequency four times the target frequency is obtained by the four phase dispersing circuit 38 and the frequency counter 34. However, instead of this, a frequency four times the target frequency also may be obtained by dividing an output frequency of the oscillating circuit 28 by a frequency divider.

The phase relation of driving pulses p1 to p4 and driving pulses p5 to p8 can be reversed by a driving direction command input to the output circuit 35 of FIG. 11 so that a rotational driving direction of the vibration type actuator can be reversed.

According to the second embodiment, similar to the first embodiment, a vibration type actuator of one driving phase also can be operated.

Further, similar to the first embodiment, the second embodiment can be constructed by omitting an inductance element, as shown in FIG. 9, when the voltage of a D.C. power source is sufficiently high, or a driving voltage of the vibration type actuator is low.

What is claimed is:

1. A drving device of a vibration type actuator which obtains a driving force by exciting an electro-mechanical energy converifon element by applying a periodic signal to the ciectro-mechanical energy conversion element, comprising:

a D.C. power source;

a plurality of switching elements connected to said D.C. power source;

an inductance element connected to said phniity of switching elements to raise a voltage level applied thereto; and a drive control circuit which generates a switching pulse signal for operating said plurality of switching elements, wherein each of said plwulity of switching elements is operated by the switching pulse signal generated by said drive control cfrcuit and the switching pulse signal generated by said drive control circuit has a pulse width selected so as to set an amplitude mdc of a base frequency component to a total amplitude of higher harmonic wave frequency components of a voltage applied to said inductance element to be approximately maximum.

2. A driving device of a vibration type actuator accoiding to claim 1, wherein said plurality of switching elements include:

first and second switching elements each having one end connected to said D.C. power source and having the other end connected to a respective end of a first inductance element;

third and fourth switching elements each having one end connected to ground and having the other end connected to a respective end of said first inductance element;

fifth and sixth switching elements each having one end connected to said D.C. power source and having the other end connected to a respective end of a second inductance element; and seventh and eighth switching elements each having one end connected to ground and having the other end connected to a respective end of said second inductance element.

3. A driving device of a vibration type actuator according to claim 2, wherein switching pulses output from said drive control circuit to said first and second switching elements have a phase difference of 180 degrees relative to each other and duty cycles set in a range of 37.5±10%; and switching pulses output from said drive confrol circuit to said third and fourth switching elements respectively have shapes obtained by inverting the switching pulses given to said first and second switching elements, and are set to have pulse widths each having a suitable delay time for preventing a thwueji electric current from flowing through the switching elements in a series connection relation.

4. A driving device of a vibration type actuator which obtains a driving force by exciting an electro-mechanical energy conversion element by applying a periodic signal to the electro-mechanical enerp conversion element Comprising:

a D.C. power source;

a plurality of switching elements connected to said D.C. power source;

an inductance element connected to said plurality of switching elements to raise a voltage level applied thereto; and a drive confrol circuit which generates a switching pulse signal for operating said plurality of switching elemens, wherein said drive control circuit gradually incrnses a pulse width of the generated switching pulse signal from zero during a rising time, operates said plurality of switching elements by the switching pulse signal so that the drive control circuit sweeps the pulse width until an amplitude ratio of a base wave frequency component to a total amplitude of higher harmonic wave frequency components of a voltage applied to said inductance element is approximately maximum, and files the pulse width in this state.

5. A driving device of a vibration type actuator according to claim 4, wherein said plurality of switching elements include:

first and second switching elements each having one end connected to said D.C. power source and baying the other end connected to a respective end of a first inductance element;

third and fourth switching elements each having one end connected to ground and having the other end connected to a respective end of said first inductance element;

fifth and sixth switching elements each having one end connected to said D.C. power source and having the other end connected to a respective end of a second inductance element; and seventh and eighth switching elements each having one end connected to ground and having the other end connected to a respective end of said second inductance element.

6. A driving device of a vibration type actuator according to claim 5, wherein switching pulses output from said drive control circuit to said first and second switching elements have a phase difference of 180 degrees relative to each other and duty cycles set in a range of 37.5±10%; and switching pulses output from said drive control circuit to said third and fourth switching elements respectively have shapes obtained by inverting the switching pulses output to said first and second switching elements and are set to have pulse widths each having a suitable delay time for preventing a through electric current from flowing through the switching elements in a series connection relation.

7. A driving device of a vibration type actuator according to claim 5, wherein said drive control circuit includes:

eight times pulse generating means which generates a pulse signal having a frequency eight times a target driving frequency;

first pulse generating means which generates a pulse signal for setting a period during which eight pulses are generated to one period and setting a period during which three pulses are generated to a turning-on period on the basis of the pulse signal generated by said eight dines pulse generating mess, and outputs the pulse signal to said first switching element; and second pulse generating means which generates a pulse signal delayed by four pulses generated by said eight times puke generating means from the pulse signal generated by said first pulse generating means, and outputs the delayed pulse to said second switching element.

8. A driving device of a vibration type actuator which obtains a driving force by exciting an electro-mechanical energy conversion element by applying a periodic signal to the electro-mechanical energy conversion element comprising:

a D.C. power source;

a plurality of plural switching elements connected to said D.C. power source; and a drive control circuit which generates a switching pulse signal for operating said plurality of switching elements, wherein each of said plurality of witching elements is operated by the switching pulse signal generated by said drive control circuit and the switching pulse signal generated by said drive control circuit has a pulse width selected so as to set an amplitude ratio of a base frequency component to a total amplitude of higher harmonic wave frequency components of a voltage applied to the electro-mechanical energy conversion element to be approximately maximum.

9. A driving device of a vibration type actuator according to claim 8, wherein said plurality of switching elements includes:

first and second switching elements each having one end connected to said D.C. power source and having the other end connected to a respective end of a first electro-mechanical energy conversion element;

third and fourth switching elements each having one end connected to ground and having the other end connected to a respective end of said first electro-mechanical energy conversion element;

fifth and sixth switching elements each having one end connected to said D.C. power source and having the other end connected to a respective end of a second electro-mechanical energy conversion element; and seventh and eight switching elements each having one end connected to ground and having the other end connected to a respective end of said second electro-mechanical energy conversion element.

10. A driving device of a vibration type actuator according to claim 9, wherein switching pulses output from said drive control circuit to said first and second switching elements have a phase difference of 180 degrees relative to each other and duty cycles set in a range of 37.5±10%; and switching pulses output from said drive control circuit to said third and fourth switching elements respectively have shapes obtained by inverting the switching pulses output to said first and second switching elements, and arc sot to have pulse widths each having a suitable delay time for preventing a through electric current from flowing through the switching elements in a sales connection relation.

11. A driving device of a vibration type actuator according to claim 9, wherein said drive control circuit includes:

eight times pulse generating means which generates a pulse signal having a frequency eight times a target driving frequency;

first pulse generating means which generates a pulse signal for setting a period during which eight pulses are generated to one period and setting a period dining which three pulses az-c generated to a turning-on period on the basis of the pulse signal generated by said eight times pulse generating means, and outputs the pulse signal to said first switching element; and second pulse generating means which generates a pulse signal delayed by four pulses generated by said eight times puke generating means from the pulse signal generated by said first pulse generating means, and outputs the delayed pulse signal to said second switching element.

12. A driving device of a vibration type actuator which obtains a driving force by exciting an electro-mechanical energy conversion element by applying a periodic signal to the electro-mechanical energy conversion element comprising:

a D.C. power source;

a plurality of switching elements connected to said D.C. power source; and a drive control circuit which generates a switching pulse signal for operating said plurality of switching elements, wherein said drive control circuit gradually increases a pulse width of to generated switching pulse signal from zero during a rising time and operates said plurality of switching elements by applying the switching pulse signal no that the drive confrol circuit sweeps the pulse width until an amplitude ratio of a base wave frequency component to a total amplitude of higher harmonic wave frequency components of a voltage applied to the electro-mechanical energy conversion element is approximately maximum, and the drive control circuit fixes the pulse width in this state.

13. A driving device of a vibration type actuator according to claim 12, wherein said plurality of switching elements include:

first and second switching elements each having one end connected to said D.C. power source and having the other end connected to a respective end of a first electro-mechanical energy conversion element;

third and fourth switching elements each having one end connected to ground and having the other end connected to a respective end of said first electro-mechanical energy conversion element;

fifth and sixth switching elements each having one end connected to said D.C. power source and having the other end connected to a respective end of a second electro-mechanical energy conversion element; and seventh and eighth switching elements each having one end connected to ground and having the other end connected to a respective end of said second electro-mechanical energy conversion element.

14. A driving device of a vibration type actuator according to claim 13, wherein switching pulses output from said drive control circuit to said first and second switching elements have a phase difference of 180 degrees relative to each other and duty cycle set in a range of 37.5±10%; and switching pulses output from said drive control circuit to said third and fourth switching elements respectively have shapes obtained by inverting the switching pulses given to said first and second switching elements, and are set to have pulse widths each having a suitable delay time for preventing a through electric current from flowing through the switching elements in a series connection relation.

15. A driving device of a vibration type actuator which obtains driving force by applying a periodic signal to an electro-mechanical energy conversion element portion arranged in a vibration member, comprising:

a switching element which is switched in response to a pulse signal;

an inductance element through which an electric current intermittently flows by switching said switching element;

a circuit which applies a voltage generated by intermittently flowing the decide current through said inductance element to said electro-mechanical energy conversion element portion; and a setting circuit that sets a duty cycle of said pulse signal such that a ratio of an amplitude of the base frequency component among frequency components of a voltage applied to said inductance element to a sum of amplitudes of all higher harmonic frequency components becomes approximately maximum.

16. A driving device of a vibration type actuator which obtains a driving force by exciting an electro-mechanical energy conversion element by applying a periodic signal to the electro-mechanical energy conversion element, comprising:

a switching circuit having a switching element which is switched in response to a pulse signal;

an inductance element connected to said switching circuit to raise a voltage level by switching operation of said switching element the periodic signal of the voltage level raised by said inductance clement being applied to said electro-mechanical energy conversion element; and a setting circuit that sets a duty of said pulse signal to duty in which a ratio of an amplitude of the base frequency component among frequency components of a voltage applied to said inductance element to a sum of amplitudes of all higher harmonic frequency components becomes approximately maximum.

17. A driving device of a vibration type actuator which obtains a driving force by exciting an electro-mechanical energy conversion element by applying a periodic signal to the electro-mechanical energy conversion element, comprising:

a switching circuit having a switching element which is switched in response to a pulse signal and to which said electro-mechanical energy conversion element is connected, said periodic signal being applied to said electro-mechanical energy conversion element by a switching operation of said switching circuit; and a setting circuit that sets a duty cycle of said pulse signal to a duty cycle in which a ratio of an amplitude of the base frequency component among frequency components of a voltage applied to said electro-mechanical energy conversion element to a sum of amplitudes of all higher harmonic frequency components becomes approximately maximum.

18. A vibration type actuator including a vibration member, an electro-mechanical energy conversion element which generates vibration in the vibration member in response to a periodic signal applied to the electro-mechanical energy conversion element, and a driving device, said actuator comprising:

a D.C. power source;

a plurality of switching elements connected to said D.C. power source;

an inductance element connected to said plurality of switching elements to raise a voltage level applied thereto; and a drive control circuit which generates a switching pulse signal for operating said plurality of switching elements, wherein each of said plurality of switching elements is operated by the switching pulse signal generated by said drive control circuit, and the switching pulse signal generated by said drive control circuit has a pulse width selected so as to set an amplitude ratio of a base frequency component to a total amplitude of higher harmonic wave frequency components of a voltage applied to said inductance element to be approximately maximum.

19. A vibration type actuator including a vibration member, an electro-mechanical energy conversion element which generates vibration in the vibration member in response to a periodic signal applied to the electro-mechanical energy conversion element, and a driving device, said actuator comprising:

a switching circuit having a switching element which is switched in response to a pulse signal;

an inductance element connected to said switching circuit to raise a voltage level by switching operation of said switching element, the periodic signal of the voltage level raised by said inductance element being applied to said electro-mechanical energy conversion element; and a setting circuit that sets a duty of the pulse signal to a duty in which a ratio of an amplitude of the base frequency component among frequency components of a voltage applied to said inductance element to a sum of amplitudes of all higher harmonic frequency components becomes approximately maximum.

* * * * *

UNITED STATES PATENT AND TRADEMARK OFFICE
CERTIFICATE OF CORRECTION

PATENT NO.    : 6,608,426 B2
DATED         : August 19, 2003
INVENTOR(S)   : Tadashi Hayashi et al.

It is certified that error appears in the above-identified patent and that said Letters Patent is hereby corrected as shown below:

Column 4,
Line 3, "element:" should read -- element; --.
Line 5, "circuit:" should read -- circuit; --.

Column 6,
Line 62, "a" should read -- the --.

Column 7,
Line 53, "bl" should read -- pl --.
Line 54, "p8" should read -- p8. --.

Column 9,
Line 10, "bl" should read -- pl --.
Line 16, "p2" should read -- p2, --.
Line 18, "p2" should read -- p2, --.
Line 18, "p6" should read -- p6, --.
Line 59, "drving" should read -- driving --.
Line 61, "converifon" should read -- conversion --.
Line 62, "ciectro-mechanical" should read -- electro-mechanical --.

Column 10,
Line 1, "phniity" should read -- plurality --.
Line 7, "plwulity" should read -- plurality --.
Line 9, "cfrcuit" should read -- circuit --.
Line 11, "mdc" should read -- ratio --.
Line 16, "accoiding" should read -- according --.
Line 41, "confrol" should read -- control --.
Line 46, "thwueji" should read -- through --.
Line 52, "enerp" should read -- energy --, and "Compris-" should read -- compris- --.
Line 61, "confrol" should read -- control --.
Line 62, "elemens," should read -- elements --.
Line 63, "incrnses" should read -- increases --.

UNITED STATES PATENT AND TRADEMARK OFFICE
CERTIFICATE OF CORRECTION

PATENT NO.    : 6,608,426 B2
DATED         : August 19, 2003
INVENTOR(S)   : Tadashi Hayashi et al.

It is certified that error appears in the above-identified patent and that said Letters Patent is hereby corrected as shown below:

Column 11,
Line 5, "files" should read -- fixes --.
Line 10, "baying" should read -- having --.
Line 48, "dines" should read -- times --, and "mess," should read -- means --.
Line 52, "puke" should read -- pulse --.
Line 63, "plural" should be deleted.

Column 12,
Line 1, "witching" should read -- switching --.
Line 3, "circuit" should read -- circuit, --.
Line 24, "eight" should read -- eighth --.
Line 37, "arc sot" should read -- are set --.
Line 39, "sales" should read -- series --.
Line 48, "dining" should read -- driving --.
Line 49, "az-c" should read -- are --.
Line 55, "puke" should read -- pulse --.

Column 13,
Line 5, "to" should read -- the --.
Line 8, "no" should read -- so --, and "confrol" should read -- control --.
Line 62, "decide" should read -- electric --.

Column 14,
Line 14, "element" should read -- element, --.
Line 19, "to duty" should read -- to a duty --.

Signed and Sealed this

Twentieth Day of April, 2004

JON W. DUDAS
*Acting Director of the United States Patent and Trademark Office*